UNITED STATES PATENT OFFICE.

JOSEPH HUBER, OF NEW YORK, N. Y., ASSIGNOR TO HUBER, HEPPE & CO., OF SAME PLACE.

IMPROVED PROCESS OF PREPARING CHROME VERMILION.

Specification forming part of Letters Patent No. 44,370, dated September 20, 1864; antedated September 16, 1864.

*To all whom it may concern:*

Be it known that I, JOSEPH HUBER, of the city, county, and State of New York, have invented a new and Improved Paint Composition; and I do hereby declare that the following is a full, clear, and exact description of the same.

The object of this invention is to produce a paint similar to the Chinese or Japanese vermilion of equal or better quality and at a price much lower than the usual price of said foreign paint.

My paint is produced by treating white lead and bichromate of potash in the following manner: I first take one hundred pounds of dry white lead and boil it in fifty-five gallons of pure water. At the first boiling I add twenty-seven pounds of bichromate of potash, and stir the whole well together. If the mixture commences to turn red, I add from one to one and one-half gallons of clear lime-water, and then the whole mass is boiled together from five to six hours. After the lapse of that time it is left to cool at rest, and the coloring-matter precipitates to the bottom. The liquid is drained off and the coloring-matter well washed. This operation I perform in the easiest and most perfect manner by placing the mixture in a vessel of from seventy-five to eighty gallons capacity, which is provided with a supply-pipe at the bottom and with an overflow-pipe at the top. A continuous current of water can thus be made to pass through the paint until the washing operation is completed. As soon as the water runs off perfectly clear the paint is clear, and it is now removed from the washing-tank and spread in layers of about one-half inch (more or less) thickness on linen strips and dried in the dark. When dry it is sifted, and then it is ready for use.

By this process a paint can be produced similar in shade to the Chinese vermilion and much cheaper than the paint usually imported from abroad. The body of my paint is superior to that of similar paints heretofore manufactured, and by manufacturing a paint of this peculiar shade a long-felt deficiency is remedied.

What I claim as new, and desire to secure by Letters Patent, is—

A paint produced by mixing white lead and bichromate of potash together about in the proportion herein set forth, and treating it substantially in the manner specified.

JOS. HUBER.

Witnesses:
D. ROBERTSON,
THOS. S. J. DONZLAR.